Dec. 5, 1939.  C. C. STETSON  2,182,005
FREIGHT CARRIER
Filed June 20, 1938
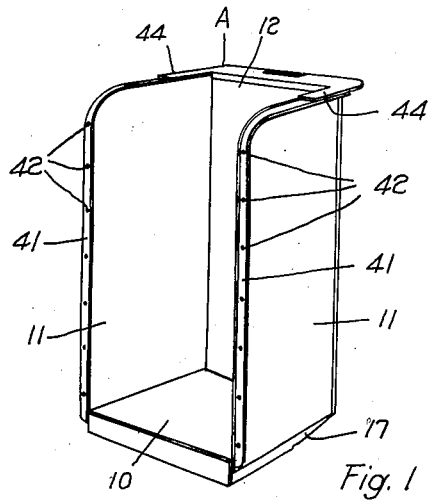
Fig. 1
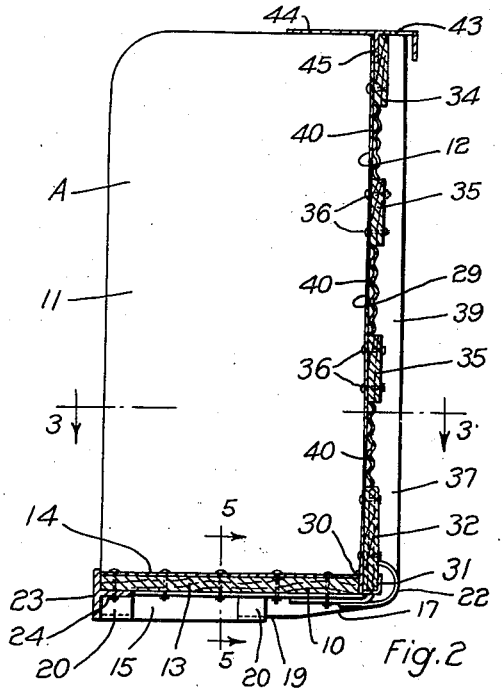
Fig. 2
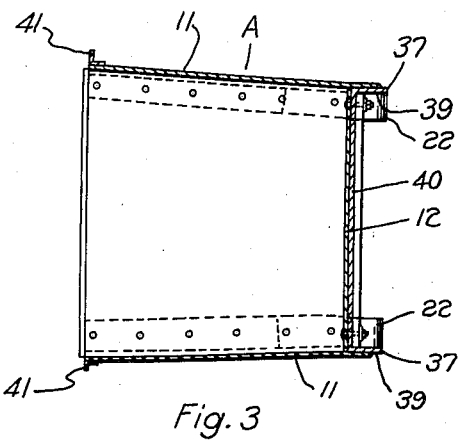
Fig. 3
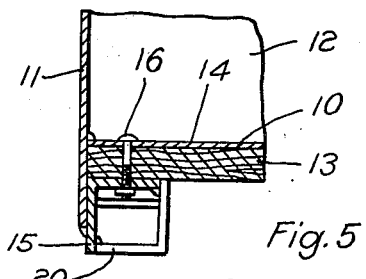
Fig. 5
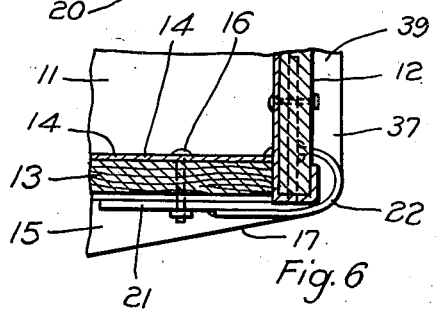
Fig. 6
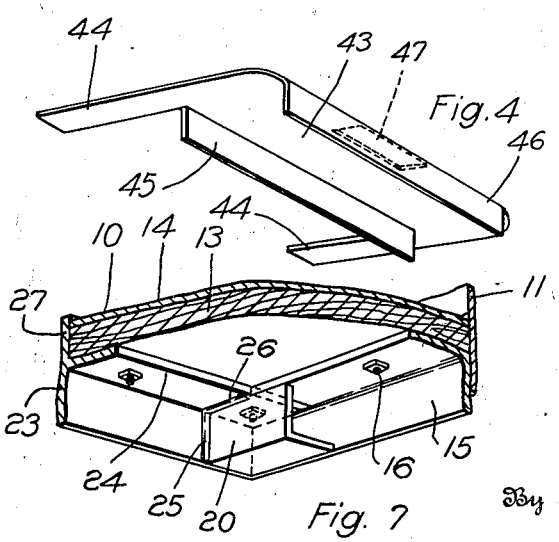
Fig. 4
Fig. 7
Inventor
Charles C. Stetson
By Howard F. Fischer
Attorney Patented Dec. 5, 1939

2,182,005

UNITED STATES PATENT OFFICE 2,182,005

FREIGHT CARRIER

Charles C. Stetson, St. Paul, Minn.

Application June 20, 1938, Serial No. 214,855

10 Claims. (Cl. 214—65)

My invention relates to an improvement in a demountable freight carrier, wherein it is desired to provide a carrier device suitable for transporting goods of moderate size so that a considerable amount of such goods may be moved simultaneously without the necessity of handling each piece several times.

The present invention comes within a class of freight moving equipment, wherein a carrier is provided to move package cargo in approximately vertical piles so that said cargo may be carried from place to place upon a two-wheel warehouse truck of any ordinary construction. These carriers are so designed that they may be lifted and tilted onto the truck from the back while the cargo of merchandise is maintained in approximately vertical position, as it has been before tilted. Containers designed to accomplish my result have previously been made, but these former types of containers were constructed with inclined backs in order to make it possible for one man to tilt the container onto the truck. While such carriers have been a decided improvement over the former method of handling packages of goods separately, they are impractical for light goods, such as frail furniture and household effects, and are liable to result in crushing the rear edges of cartons of goods piled therein, or to slip off from the jar of moving.

It is an object of the present invention to provide a carrier having an open front and top with closed sides, back, and base, which may be easily transported upon a two-wheeled truck and which is of sufficient size to contain packages of the ordinary household goods, such as dining room chairs, barrels of dishes and cartons and bundles or books and other material. By grouping these goods in the containers, a large amount of goods may be handled at one time by one man, and after being placed in the containers, the goods need not be handled again until the same have reached their destination. By this method, there is also less chance of damage to frail pieces from jar in picking up and setting down the pieces numerous times. Furthermore, the goods may be moved much more quickly onto and off an elevator and may be held together with less chance of confusion or misplacement in shipping or in movement of the goods through a warehouse or the like.

It is a feature of my invention to provide a carrier which is properly constructed to withstand the strain of goods of various shapes and sizes which may be placed therein and to provide a construction which will enable the goods to be quickly and efficiently handled. The sides of my container are reinforced and the top brace and handle of the same acts to reinforce the top and sides. The base is provided with sliders which provide a larger area of bearing of the carrier upon the floor at all times whether or not the carrier is being tilted. Thus my carrier is prevented from injuring floor surfaces upon which it is rested and can easily be slid out of the aisle or moved a little.

It is an important feature of my invention to provide a carrier, the base of which is spaced from the floor by suitable angle iron or channel means, and to so taper the rear portion of such supporting means that the fulcrum is brought forward so that my carrier will tilt with little effort in placing the same upon a two-wheeled truck. Thus a heavy load of goods may be easily mounted upon a truck and moved by one man with a minimum of effort.

These and other objects and novel features of my invention will be more clearly and fully set forth in the following specification and claims.

In the drawing forming a part of my specification:

Figure 1 is a perspective view of my carrier in readiness for use.

Figure 2 is a vertical cross-sectional view centrally through my carrier.

Figure 3 is a cross-sectional view taken on the horizontal plane indicated by the line 3—3 of Figure 2.

Figure 4 is a bottom perspective view of the handle means used on my carrier.

Figure 5 is a cross-sectional view through the supporting standard, the section being taken on the line 5—5 of Figure 2.

Figure 6 is a sectional view through the corner between the rear wall of my carrier and the bottom of the same, slightly enlarged to illustrate the construction thereof.

Figure 7 is a bottom perspective detail of a front corner of my carrier.

My carrier A is built upon a strong frame of two main ribs of angle iron or other shaped rods, bent at floor level to an L-shape, and comprises in general, a base 10, a pair of oppositely disposed side walls 11, and a rear wall 12. The side walls 11 are connected at the edges to the back 12 and both the side walls 11 and the back 12 are secured to the base 10 to provide a carrier having an open front and top.

The base 10 comprises a heavier ply-wood member 13 or similar member, having a covering sheet 14 of metal of sufficient thickness to prevent injury to the board base 13. On either side of the base 10 along two opposite edges of the container A, I provide angle-iron ribs 15. To these ribs are secured by means of bolts 16 or other suitable means the board base 13 and the metallic covering sheet 14 as well as the sides and back and rest of the structure.

Rearwardly from the center of the container and positioned approximately two-thirds to three-fourths of the depth of the container from the front thereof, I incline or cut away the downward web of the angle iron ribs 15, as illustrated in Figures 1, 2, and 6 of the drawing. This incline 17 slants from the rear toward the fulcrum and permits the container A to be easily tilted rearwardly onto a two-wheeled truck when placed beneath the base 10 and pulled from the back. A notch 19 is preferably provided between the incline 17 and the fulcrum of the ribs 15 to permit the carrier to be tilted to the rear despite any small projection, such as a stone or nail head at this point which might otherwise reduce the advantage of the full incline.

Adjacent the incline 17 and near the extreme front end of the ribs 15, I provide sliders 20 which may be formed as illustrated in Figures 2, 5, and 7 of the drawing. These sliders are formed of angle iron similar to the ribs 15 and are securely welded to the ribs 15 to form a rectangular box providing a larger area for the container to rest upon. As illustrated in Figures 2 and 6 of the drawing, I provide a reinforcing strip 21 which underlies the horizontal web of the angle iron ribs 15 and also extends upon the corresponding web of the angle iron vertical ribs, all strongly welded and reinforcing the back in a manner which will be later described. Attached to the reinforcing strip 21 I provide slider strips 22 which are secured to underlie the reinforcing strips 21 and to be formed in loop shape so that the end thereof may be welded to the vertical extending portion of the reinforcing strip 21, as well as to the vertical angle iron ribs of the back in a manner which will be later described.

At the front of the carrier A, I provide a T-iron member 23, having a web 24 which extends beneath the boards 13 forming a part of the base 10. This T-iron forms a counterbalance to offset the weight of the carrier back and to hold the carrier in upright position when empty. The construction of this T-iron 23 may best be noted in Figure 7 of the drawing and the manner in which the flange 24 is cut away at each end to permit the angle iron ribs and the front sliders 20 attached thereto to extend to the front of the carrier. As illustrated, the T-member 23 is welded to the slider 20 at 25 and to the angle iron rib 15 at 26, as well as at the extreme corner where the vertical web 27 of the T-member 23 adjoins the vertical web of the angle iron rib 15.

The back wall 12 of my carrier is provided with a strong metallic lining sheet 29 which is welded at 30 to the covering sheet 14 of the base 10 and which preferably extends down to provide a covering flange 31 to inclose a cross member 32 which may be a board or the like.

At the top of the back 12, the metallic sheet 29 extends along a top reinforcing cross member 34 which also may be a board, and is secured thereto. Intermediate the cross members 32 and 34 in spaced relationship, I may provide other cross stiffening members 35 securely bolted by bolts 36 or otherwise affixed to the ribs 37.

Extending vertically from the base 10 to the top of the carrier, I provide angle iron ribs 37 which are welded or bolted directly to the sheet 29. These angle irons 37 have a rearwardly extending web 39 and a connecting web which underlies a portion of the sheet 29. Between the edges of these overlying webs of the angle irons 37 and between the spaced cross members 35 and the top and bottom members 32 and 34, respectively, I provide corrugated reinforcing 40 which is preferably of sheet metal spot-welded in place to the back sheet 29. This corrugated reinforcing prevents distortion of the back.

The reinforcing strip 21 overlies the web of the angle irons 37 which in turn overlies the sheet 29 and is welded directly to this overlying web. The web 39 of the angle iron members 37 are rounded at the lower corners to conform with the arcuation of the reinforcing strip 22, forming a slider at the rear of the carrier.

The sides 11 are preferably formed of sheet metal or the like, and are welded along the bottom edge to the cover sheet 14 of the base 10 and to the angle iron base ribs 15. Along the rear edge of the sides 11, these sheets are welded or otherwise affixed to the sheet 29 and to the angle iron rib members 37. The front and top edges of the sides 11 are reinforced by light angle iron members 41 which extend from the front of the container at the bottom thereof, upwardly along the front edge of the sides 11 and then extend rearwardly along the top edge of the sides 11 to the rear edge of these sides. The angle iron members 41 may have openings 42 to accommodate cross ties, not illustrated in the drawing, but which may extend transversely between the angle irons 41 to prevent the goods within the carrier from falling out the open front of the same in case there is a tendency for the goods to do so.

Across the back at the top of the carrier I provide a combination brace and handle piece 43 which is preferably shaped as shown in Figure 4 of the drawing. This piece 43 is provided with a pair of side extensions 44 which overlie and are firmly welded to the rear portion of each angle iron binder piece 41, strongly reinforcing the sides against spreading. This top piece 43 is provided with a downward flange 45 the width of the back to which is attached the top of the inner surface 29 of the back. Another downward flange 46 is provided which may be engaged by the operator's hand when pulling the container back to mount upon the two-wheeled truck. I also provide an ample opening 47 through the top at the edge of this piece 43 enabling the operator to grasp it from above or to engage a hook tie piece connecting this carrier with other carriers in tandem during shipping operations. The flange 46 extending from side to side of the carrier enables the operator to exert his main pull where most needed in case the carrier has been unevenly loaded.

In operation several of these containers may be loaded at the receiving platform on an incoming lot with boxes and small packages. When filled, the containers are easily pulled back upon a truck and rolled upon the elevator and removed at the desired floor landing. When the operators are ready to stow or pile the lot, these loaded carriers are easily remounted upon a two-wheeled truck and wheeled to the point desired and there unloaded. The empty carriers may then be nested together, due to the outward flare in the construction thereof, and moved to a convenient place until again required. If the goods are to be removed before long, the goods may remain in the carriers. An entire lot of small packages may thus be contained in a single carrier, avoiding much of the danger of mislaying a part of the lot of goods, and eliminating handling each separate package or article in the lot of goods a number of times. In the usual experience of a storage warehouse these carriers can handle more than half the separate packages of an average storage lot and save about two man hours of labor on an incoming lot and an equal time when it goes out.

This carrier device is of such size and shape that it can on occasion be handled and carried with a load by two men without a truck, since the front toe piece and the back pull and brace furnish excellent holds for the hands.

In accordance with the patent statutes, I have described the principles of construction and operation of my demountable freight carriers, and while I have endeavored to set forth the best embodiment thereof, I desire to have it understood that this is only illustrative of a means of carrying out my invention and that obvious changes may be made within the scope of the following claims without departing from the spirit of my invention.

I claim:

1. A freight carrier comprising a base, a back extending substantially vertically from said base, supporting members on opposite sides of said base to support said carrier with said back substantially vertical, spacing said base from the floor, said supporting members being upwardly and rearwardly tapered from a point near the center of the sides to the rear end thereof to support said carrier at a predetermined angle with respect to the vertical to permit said carrier to be easily tilted.

2. A freight carrier comprising a base, a back extending substantially vertically from said base, side walls connected to said base and said back, oppositely disposed supporting members for said base extending beneath the same, said supporting members being tapered upwardly and rearwardly from a point near the center of the sides to an end thereof to permit said carrier to be readily tilted to a predetermined angle with respect to the vertical.

3. A carrier comprising a base, a back member secured thereto, a pair of oppositely disposed supporting members extending beneath said base, and upwardly and rearwardly inclined surfaces on said supporting members extending from a point near the center thereof to the rear end of the same at a predetermined angle with the horizontal to permit said carrier to be readily tilted to a predetermined angle with respect to the vertical.

4. A carrier comprising a base, a back secured thereto, oppositely disposed ribs engageable with the ground and supporting said base, and spaced sliders on said ribs providing portions of increased area for bearing upon the ground longitudinally spaced along said ribs.

5. A carrier comprising a base, a back secured thereto, oppositely disposed ribs engageable with the ground for supporting said base, sliders on said ribs providing portions of increased area on said runners, and a rounded slider secured to each rib at one end thereof to engage the ground to provide a bearing of substantial area when said carrier is tilted.

6. A carrier handle to be secured to a carrier back and including a flange attached to the inner surface of said back, an intermediate portion extending over the top edge of said back, and a downwardly extending flange on said intermediate portion for engagement by the fingers.

7. A carrier handle to be secured to a carrier, said handle including an intermediate portion, a downwardly extending flange thereupon attached to said back, a substantially parallel downwardly extending flange on said intermediate portion for engagement with the fingers, said intermediate portion of said handle having an opening therethrough adjacent said last-mentioned downwardly extending flange so that said flange may be readily engaged by the hand.

8. A carrier comprising a base, oppositely disposed ribs for said base, upwardly and rearwardly tapered ends on said ribs extending from a point near the center of the ribs to the rear ends thereof, a back secured to said base along the rear edge thereof, and a counter-balance means secured adjacent the front edge of said base.

9. A carrier comprising a base, a back secured thereto, oppositely disposed ribs supporting said base having a lower ground contacting surface thereupon, an upwardly and rearwardly inclined surface at one end of said ribs extending from a point near the center of the ribs to the rear ends thereof, said ribs having a notch therein between said inclined surface and said ground engaging surface.

10. A package carrier comprising a base, a vertical back secured thereto, and supporting ribs under said base, said ribs providing a bearing to rest on the floor extending from a point adjacent the front of said base to a point spaced from the back thereof to hold said back extending vertically, and means cooperating with said ribs to support said back at a predetermined angle with the vertical to permit said carrier to be easily tilted rearwardly.

CHARLES C. STETSON.